Figure 1:
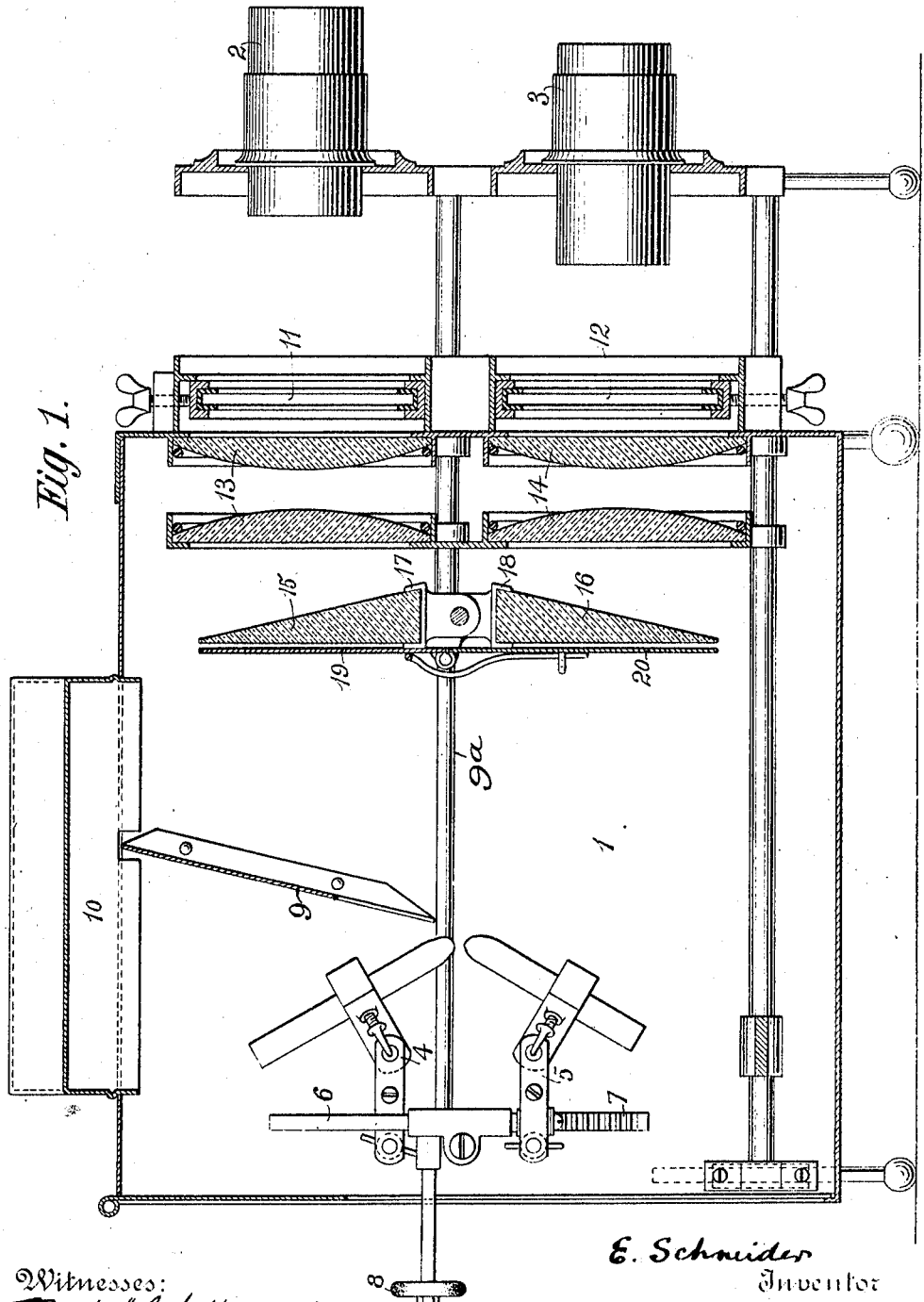

E. SCHNEIDER.
OPTICAL PROJECTING APPARATUS.
APPLICATION FILED NOV. 28, 1908.

953,105.

Patented Mar. 29, 1910.
3 SHEETS—SHEET 1.

Witnesses:
Raphaël Netter
L. Dunham

E. Schneider
Inventor

By his Attorneys
Kerr, Page, Cooper & Hayward

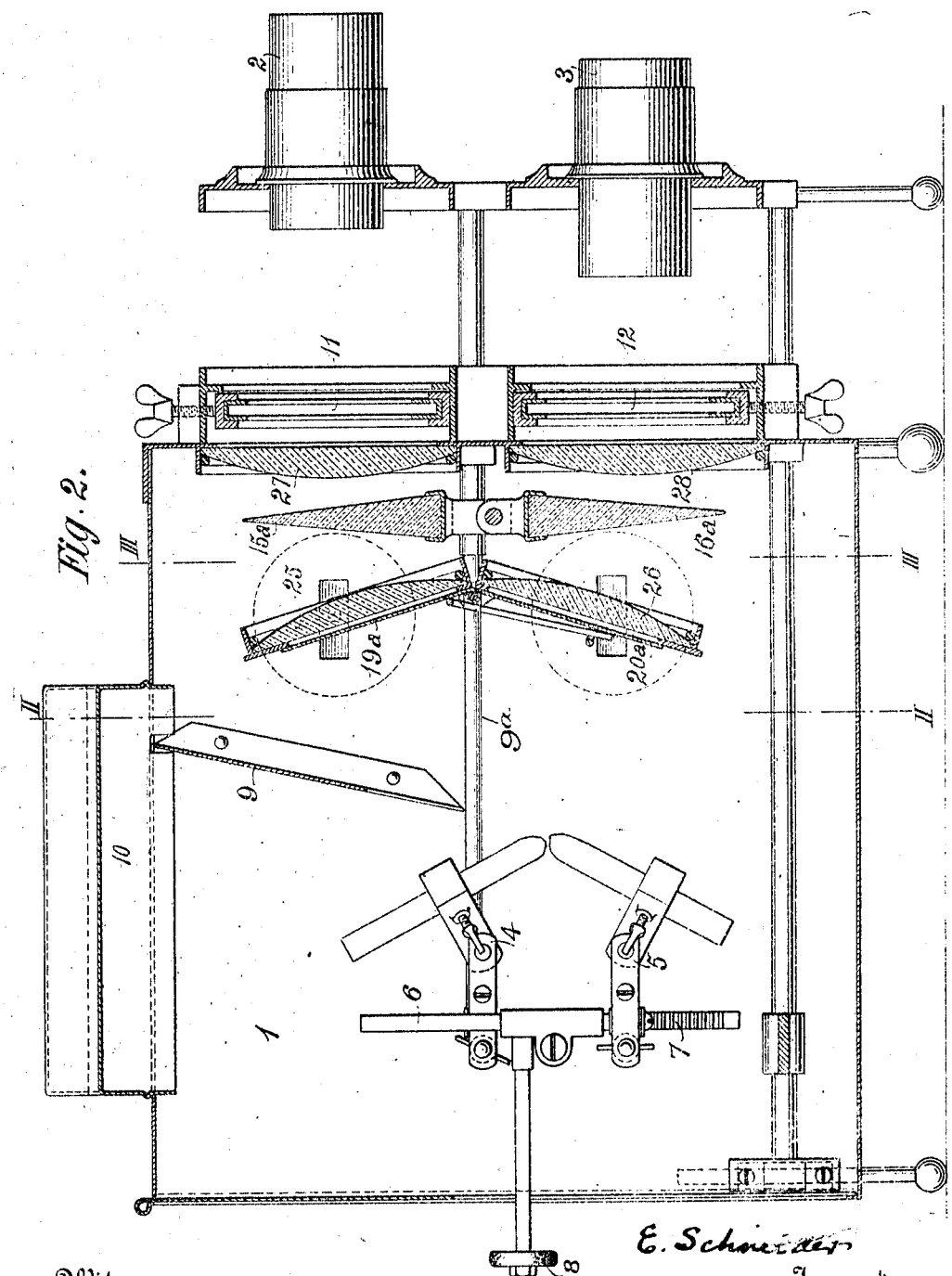

E. SCHNEIDER.
OPTICAL PROJECTING APPARATUS.
APPLICATION FILED NOV. 28, 1908.
953,105.
Patented Mar. 29, 1910.
3 SHEETS—SHEET 3.
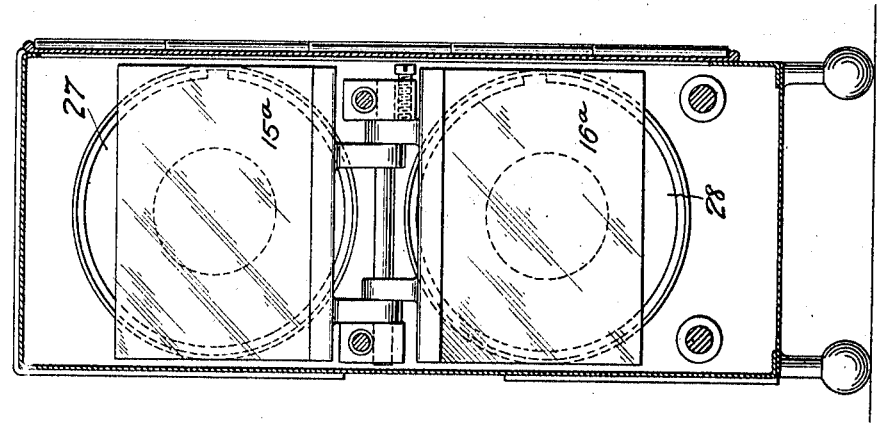
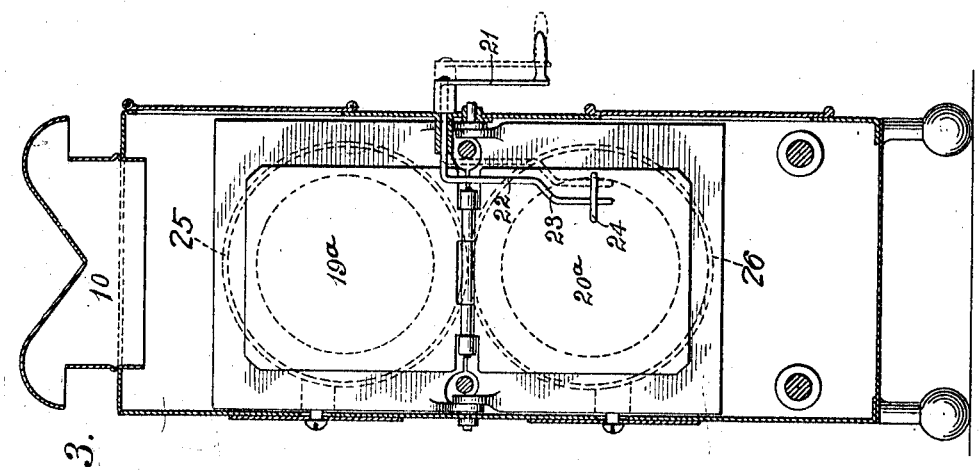

UNITED STATES PATENT OFFICE.

EBERHARD SCHNEIDER, OF NEW YORK, N. Y.

OPTICAL PROJECTING APPARATUS.

953,105.  Specification of Letters Patent. Patented Mar. 29, 1910.

Application filed November 28, 1908. Serial No. 464,928.

*To all whom it may concern:*

Be it known that I, EBERHARD SCHNEIDER, a citizen of the United States, residing at New York, in the county of New York and State of New York, have invented certain new and useful Improvements in Optical Projecting Apparatus, of which the following is a specification, reference being had to the drawings accompanying and forming part of the same.

This invention relates to projecting apparatus, more particularly of the so-called "dissolving view" type, in which the picture on the screen is made to fade away concurrently with the gradual appearance of the succeeding picture. In apparatus of this type as hitherto constructed the dissolving effect is usually produced by manipulation of the lights in two adjacent lanterns. Thus while a picture in one of the lanterns is thrown on the screen with full brilliancy the slide bearing the next picture to be exhibited is inserted in the other lantern, the light of which is of course extinguished or so dim as to be practically extinguished; the light in the first lantern is then diminished gradually, while the light in the second is gradually increased, with the result that the first picture appears to dissolve into the second. The successful operation of such an apparatus demands great skill on the part of the operator in manipulating the lights, as both sources must be controlled simultaneously. This means, where calcium lights are used, that one gas-cock must be turned off slowly while another is being turned on at a corresponding rate, without in the one case extinguishing the flame, which would necessitate relighting, with possible delay and confusion in the orderly progress of the exhibition, and without in the other case making the flame too intense, which might result in fracturing the lime. Where the electric arc is employed the operation is even more difficult, as the operator has not only to control the intensity of the lights but also to keep the carbons at the proper distance apart and keep each arc at the focus of its condenser. I have therefore been led to devise my present invention, which has for its chief object to provide a projecting apparatus which will give satisfactory dissolving-view effects with a single source of light kept continuously at full brilliancy. Thus the principal source of trouble, to wit, the manipulation of two sources of light simultaneously, is eliminated.

In carrying out my invention in the preferred manner the two objectives are mounted one above the other, or side by side, as may be most convenient, and each has its own condensing lens as is customary. Back of the condensers is the lantern body or light chamber, in which is a single source of light, say a calcium light or an electric arc, arranged in the plane which passes midway between the two condensers, or as close to said plane as is practicable. Adjacent to each condenser I arrange one or more glass prisms of triangular cross-section, disposed with their bases adjacent to each other. The effect of the prisms is to deflect the light, from the single source, in two beams directly into the respective condensing lenses. Two screens or shutters are provided, arranged to cut off the light to either or both condensers at will, so that either picture can be projected, and provision is made whereby if desired the actuation of a single operating member will close one shutter as the other opens, and vice versa. Thus by the manipulation of a single member, with the light at full brilliancy at all times, the operator can throw the light into the condensers alternately; and since the shutters can be operated at any desired speed of movement the light can be thrown into one condenser and cut off from the other as gradually and evenly as desired. In this way very satisfactory and pleasing dissolving effects can be obtained.

It will be apparent to those skilled in the art that the scheme thus briefly outlined can be embodied in various constructions. Of these I have selected for illustration and specific description herein two arrangements which exhibit the invention in convenient and effective form.

Referring now to the drawings, Figure 1 is a longitudinal sectional view of the preferred form of the invention. Fig. 2 is a similar view of another form. Figs. 3 and 4 are sectional views on lines II—II and III—III respectively, of Fig. 2.

Throughout the various figures, 1 designates a lantern body, in front of which are the two objectives, 2, 3, preferably one above the other as shown. Within the lantern body is a single source of light, for example an electric arc light, the two carbons being held by two adjustable holders 4, 5, carried by vertical rack-bars 6, 7, in mesh with a pinion (not shown) which is rotated by a hand wheel 8 projecting to the rear of the lantern. The parts just described are supported on a rod 9ª by any suitable devices, not shown, to permit vertical, lateral, and longitudinal adjustment, so that the arc can be located at any desired point with respect to the objectives and other parts hereafter to be described. Since devices for effecting such adjustments are well known in the art, and since the same are not a part of my present invention, further description thereof is unnecessary. In front of the light is the usual heat screen 9, extending to the chimney 10. The slide carriers 11, 12, are arranged in front of the forward wall of the lantern body, as is customary; said wall of course having suitable openings to permit the passage of light, as shown.

Referring now to Fig. 1, behind the slide carriers are the condensers 13, 14, each, in the present instance, composed of two plano-convex lenses arranged with their convex surfaces toward each other, and supported in any convenient and suitable manner. The condensers serve their usual purpose, to converge, or condense, the light through the picture-slides into objectives. Back of the condensers are two triangular prisms 15, 16, preferably of the right-angled type shown, arranged with their inclined surfaces toward the condensers, and with their bases horizontal and parallel. This makes the rear faces of the prisms vertical and therefore more nearly perpendicular to the rays of light, so that as much light as possible will enter the prisms and as little as possible be reflected. The prisms are adjustable toward and from the condensers, on the rod 9ª, and their supporting members 17, 18 are hinged together, as shown, so as to permit slight angular adjustment. Back of the prisms are two hinged shutters, 19, 20, and journaled in the side of the lantern (see Fig. 3) is an operating lever 21, the arm 22 of which is off-set at 23. This lever is movable axially in its bearings, and when the same is drawn out, as shown in dotted lines in Fig. 3, it will be disengaged from shutter 19, but its off-set portion will still be in engagement with the lower shutter, 20. On the latter is guide yoke 24, arranged over the off-set portion of the lever.

From the foregoing description the operation of the apparatus will be readily understood. The parts being in the positions shown in Figs. 1 and 3, the operator inserts a picture-slide in the lower slide-carrier, and then raises the lower shutter by turning the operating crank up and to the rear until the lower shutter is parallel with the upper,—the latter of course being kept closed by the shaft-portion of the operating lever. While the lower picture is on the screen the next slide to be exhibited is inserted in the upper carrier, and at the proper time the operator draws the operating lever out, thereby disengaging the same from the upper shutter, and turns the crank back to its original position. This movement returns the lower shutter, cutting off the light from the lower prism; but at the same time the upper shutter, being disengaged from the operating lever, falls of its own weight, along with the lower shutter, so that the two in effect move as one, and one prism is gradually exposed to the light while the other is gradually covered. The operator now changes the slide in the lower carrier, and at the proper time reverses the shutters, thereby exposing the new lower slide and obscuring the upper. If at any time he desires to cut off the light from both prisms, the shutters are brought to the upper position and the operating lever pushed in, re-engaging the upper shutter. The lower shutter can now be lowered without the other following it, as in Figs. 1 and 2. The effect of the prisms, as previously stated, is to bend the light rays into the condensers. By properly shaping the prisms, with due regard to the refractive index of the glass or other transparent medium employed, the rays may be made to strike the condensers substantially parallel with the axes thereof, instead of at a wide angle as would be the case without the prisms, in which case only a comparatively small proportion of the light would be directed into the objectives.

In the construction illustrated in Fig. 2 the prisms, 15ª, 16ª, are of the isosceles type and are located between the lenses of the condensers, the rear condenser lenses 25, 26, being inclined toward the source of light so that the rays will strike the plane surfaces thereof at substantially right angles. The rays are thus converged upon the prisms, and are bent or refracted thereby into the front condenser lenses 27, 28. Back of the rear condenser lenses are the shutters 19ª, 20ª, like those illustrated in Fig. 1, and operated by similar mechanism. In Fig. 2 the source of light is shown much below its best position, in order to indicate the adjustability of the source. In use the carbons would be raised until the arc is about in the central horizontal plane.

The refraction of the light by the prisms of course results in slight dispersion, but by reason of the considerable distance of the screen from the objectives and the consequently great elongation of the spectrum the colors are so thinned out, so to speak, as to be unobjectionable if noticeable at all. With colored slides the spectrum colors are imperceptible.

It will now be seen that my invention eliminates a large part of the work of the operator, leaving him at liberty to devote more attention to the care and disposition of the slides, to maintaining the light in good condition and keeping it at the proper position with respect to the optical elements of the apparatus, etc. Although the source of light is kept at full brilliancy it is evident that a single source burning continuously will consume practically no more gas or current than two lights burning in alternation.

As previously stated, the forms herein specifically described are given as convenient and effective embodiments and not as the only embodiments of which the invention is capable. Moreover, the details of construction in the forms herein shown may be varied widely without departure from the proper spirit of the invention as defined by the appended claims.

What I claim is:

1. In an optical projecting apparatus, the combination with lens systems for projecting the pictures, and a source of light, of means for altering the paths of the rays from said source toward parallelism with the axes of said lens systems, shutters movable in unison or separately, as desired into and out of the paths of said rays, and manual means common to said shutters for operating the same, as set forth.

2. In an optical projecting apparatus, the combination with projecting objectives, and a source of light, and condensing lenses between said objectives and the source of light, of refracting prisms associated with said condensing lenses and arranged to refract the rays of light from said source toward parallelism with the axes of said condensing lenses, movable shutters in the paths of said rays, and manual means common to said shutters for operating either shutter at will, as set forth.

3. In an optical projecting apparatus, the combination of a pair of projecting systems, a source of light behind and midway between said systems, shutters hinged midway between said systems, and manual means common to both said shutters for swinging either of said shutters at will into or out of the path of the light through its respective projecting system, as set forth.

4. In an optical projecting apparatus, the combination with a pair of substantially parallel projecting systems, of a pair of hinged shutters, and an operating lever in constant operative engagement with one of said shutters and adjustable into and out of engagement with the other, as set forth.

5. In an optical projecting system, the combination with a pair of substantially parallel projecting systems, of a pair of shutters hinged at their adjacent edges whereby to be swung into and out of the path of light rays through said systems, and a manual operating lever for the shutters fulcrumed adjacent to the shutter hinges, as set forth.

6. In an optical projecting apparatus, the combination of a pair of lens systems for projecting pictures, a single source of light behind the same, refracting prisms arranged to refract the light from said source into the lens systems, supports for the prisms, and a common supporting member on which said supports are pivotally mounted to permit angular adjustment of the prisms, as set forth.

7. In an optical projecting system, the combination of a pair of substantially parallel lens systems, a single source of light behind the same, a pair of rods parallel to and in the rear of said lens systems, refracting prisms for refracting the rays of light from said source into the lens systems, pivotal prism-supporting devices mounted on one of said rods to permit angular adjustment of the prisms, and means for cutting off the light to either lens system at will, as set forth.

EBERHARD SCHNEIDER.

Witnesses:
M. LAWSON DYER,
S. S. DUNHAM.